(12) United States Patent
Iwamoto et al.

(10) Patent No.: US 7,701,698 B2
(45) Date of Patent: Apr. 20, 2010

(54) INFORMATION PROCESSING APPARATUS

(75) Inventors: Akira Iwamoto, Osaka (JP); Isao Shimada, Hyogo (JP); Jun Satoh, Osaka (JP); Hitoshi Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 12/202,763

(22) Filed: Sep. 2, 2008

(65) Prior Publication Data
US 2009/0059493 A1 Mar. 5, 2009

(30) Foreign Application Priority Data
Sep. 3, 2007 (JP) ............... 2007-227731

(51) Int. Cl.
*G06F 1/16* (2006.01)
(52) U.S. Cl. .................. 361/679.08; 455/574; 711/163; 345/157
(58) Field of Classification Search ................ 455/574, 455/566, 132, 573.3, 575.5; 711/103, 163; 345/156, 157; 710/62, 105; 379/210.02; 361/679.27, 679.48, 679.31, 679.55, 679.09, 361/679.01
See application file for complete search history.

(56) References Cited

U.S. PATENT DOCUMENTS

| 5,163,765 | A | 11/1992 | Levy |
| 5,477,238 | A | 12/1995 | Aharanson et al. |
| 5,569,889 | A | 10/1996 | Bruner |
| 6,201,693 | B1 * | 3/2001 | Kamimaki et al. ..... 361/679.01 |
| 2004/0061998 | A1 * | 4/2004 | Ko .............................. 361/683 |
| 2007/0008691 | A1 * | 1/2007 | Kim ........................... 361/683 |
| 2009/0059504 | A1 * | 3/2009 | Iwamoto et al. ............. 361/683 |

FOREIGN PATENT DOCUMENTS

| JP | 6-12164 | 1/1994 |
| JP | 8-110825 | 4/1996 |
| JP | 10-501649 | 2/1998 |
| JP | 11-345066 | 12/1999 |
| JP | 2005-128610 | 5/2005 |

* cited by examiner

*Primary Examiner*—Hung V Duong
(74) *Attorney, Agent, or Firm*—Hamre, Schumann, Mueller & Larson, P.C.

(57) ABSTRACT

An information processing apparatus of the present invention includes an upper casing 11, a lower casing 12 coupled to the upper casing 11 and forming a space for housing at least an electrical element, and a keyboard 3 disposed on the upper casing 11. The lower casing 12 includes a wall portion 13*d* arranged to stand from the inner bottom 12*d*, and a supporting face 13*a* formed integrally with the wall portion 13*d* from the wall portion 13*d* in a direction substantially parallel to the inner bottom 12*d*. The supporting face 13*a* is disposed at a position where the rear side of the operational side of the keyboard 13 can be supported. With such a configuration, key touch feeling of the keyboard can be prevented from declining, and an excellently robust information processing apparatus can be achieved.

3 Claims, 6 Drawing Sheets

INFORMATION PROCESSING APPARATUS

BACKGROUND OF THE INVENTION

1. Field of the Invention

The present invention relates to an information processing apparatus such as a notebook personal computer (hereinafter referred to as a notebook PC). Particularly, the present invention relates to a casing structure of an information processing apparatus.

2. Description of Related Art

Nowadays, efforts have been made to improve the operating feeling of notebook PCs as the PCs are becoming multi-functional and their processing is becoming high-speed. As an effort to improve the operating feeling, for example, tactile feel upon depressing keys on a keyboard has been considered as important.

FIG. 8 illustrates an external view of a notebook PC as an example of a conventional information processing apparatus. As shown in FIG. 8, the notebook PC is configured of a first casing 101 provided with a keyboard 103, and a second casing 102 provided with a liquid crystal monitor 104. The first casing 101 and the second casing 102 are coupled pivotally by a hinge mechanism.

FIG. 9 is a cross-sectional view along a dash-dotted line portion X in FIG. 8. For clear illustration, a partial cross-sectional view is provided. In FIG. 9, illustration of various devices such as an electric circuit board, a central processing unit (CPU), and so on disposed in the first casing 101 is omitted. At the rear side of the keyboard 103, switches are disposed at positions corresponding to respective keys forming the keyboard 103, but illustrations of these are omitted. As shown in FIG. 9, the casing 101 is configured of an upper casing 101a and a lower casing 101b. The keyboard 103 is disposed on top of the upper casing 101a. The upper casing 101a on which the keyboard 103 is disposed is supported by some bosses and ribs (not shown) formed on the lower casing 101b. Keyboards with various structures are disclosed in Patent Document 1 (JP 2005-128610A), Patent Document 2 (JP H 6-12164A), Patent Document 3 (JP H 10-501649A), Patent Document 4 (JP H 8-110825A), and Patent Document 5 (JP H 11-345066A).

In many cases, in notebook PCs, their casings are formed thinly to reduce the weight. However, when the upper casing 101a shown in FIG. 9 is formed thinly and an operator depresses the keyboard 103 supported by the upper casing 101a with his/her fingers in the direction indicated by arrow Y, because there is no member to support the keyboard 103 and the upper casing 101a below the keyboard 103, the upper casing 101a is sinks down along with the keyboard 103, as shown in FIG. 10. Therefore, even if a click feeling is provided to each key forming the keyboard 103, since the upper casing 101a is sinks down upon operation using the keys, the click feeling of the keys is impaired.

Additionally, when the upper casing 101a is formed thinly, its strength decreases, and therefore upon application of a strong pressure to the surface thereof, the upper casing 101a flexes, which possibly may damage various components disposed inside the casing.

SUMMARY OF THE INVENTION

Therefore, with the foregoing in mind, it is an object of the present invention to provide a casing structure for information processing apparatus, which prevents a decline in key touch feeling of the keyboard and which is excellently robust.

An information processing apparatus of the present invention includes an upper casing; a lower casing coupled to the upper casing and forming a space for housing at least an electrical element; and a keyboard disposed on an upper surface of the upper casing, wherein the lower casing comprises an inner bottom; a wall portion arranged to stand from the inner bottom, and a supporting face formed integrally with the wall portion from the upper end of the wall portion in a direction substantially parallel to the inner bottom; and the supporting face is disposed at a position where the rear side of the operational side of the keyboard can be supported.

According to the present invention, since the keyboard is supported in the direction opposite to the direction of key depression by the fingers, flexing of the keyboard from the depression can be prevented, and key touch feeling can be improved. The overall strength of the casing can also be improved.

DETAILED DESCRIPTION OF THE INVENTION

Hereinafter, the present invention will be described by way of illustrative embodiments with reference to the drawings.

An information processing apparatus of the present invention includes an upper casing; a lower casing coupled to the upper casing and forming a space for housing at least an electrical element; and a keyboard disposed on an upper surface of the upper casing. The lower casing comprises an inner bottom; a wall portion arranged to stand from the inner bottom, and a supporting face formed integrally with the wall portion from the upper end of the wall portion in a direction substantially parallel to the inner bottom; and the supporting face is disposed at a position where the rear side of the operational side of the keyboard can be supported. With such a configuration, flexing of the upper casing can be curbed when the keyboard is depressed, and a decline in key touch feeling of respective keys in the keyboard can be prevented.

Based on the above-described basic configuration, the following are possible embodiments of an information processing apparatus of the present invention. That is, in an information processing apparatus of the present invention, the supporting face can be configured to be disposed at a position where a portion of the upper casing can be supported. With such a configuration, the strength of the upper casing can be improved, and deformation when a strong pressure is applied to the upper casing can be curbed. Therefore, electrical elements disposed in the casing can be prevented from being damaged.

The upper casing and the lower casing may be molded of any of aluminum, magnesium, aluminum alloy, and magnesium alloy. With such a configuration, a lightweight and robust casing can be achieved.

Embodiment

Figure 1:
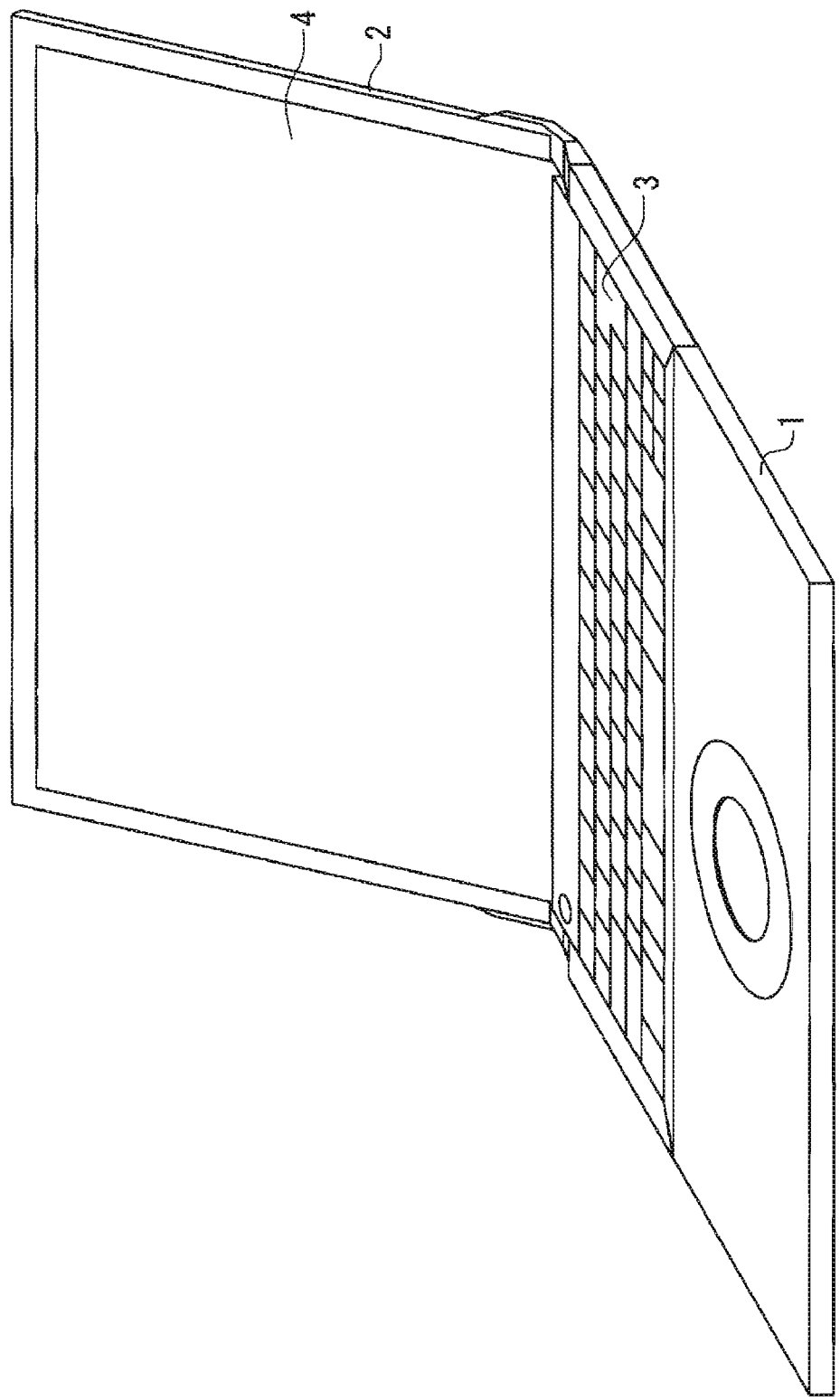
FIG. 1 is a perspective view illustrating an external view of an information processing apparatus in an embodiment.

FIG. 1 is a perspective view illustrating an external view of a notebook PC as an example of an information processing apparatus in an embodiment.

As shown in FIG. 1, the notebook PC is configured of a first casing 1 provided with a keyboard 3, and a second casing 2 provided with a liquid crystal monitor 4. The first casing 1 and the second casing 2 are coupled pivotally by a hinge mechanism. The first casing 1 and the second casing 2 are formed of a resin or a light metal (for example, any of aluminum, magnesium, aluminum alloy, and magnesium alloy).

The keyboard 3 includes a flexible thin-plate substrate with a plurality of switches mounted thereon, and keys for a user to depress are provided on top of respective switches. The keys are supported by the substrate so as to be movable in a direction normal to the substrate face where the switches are mounted. Furthermore, the keys are impelled by an elastic means such a spring so as to stay at a predetermined position when not depressed by a user.

Figure 2:
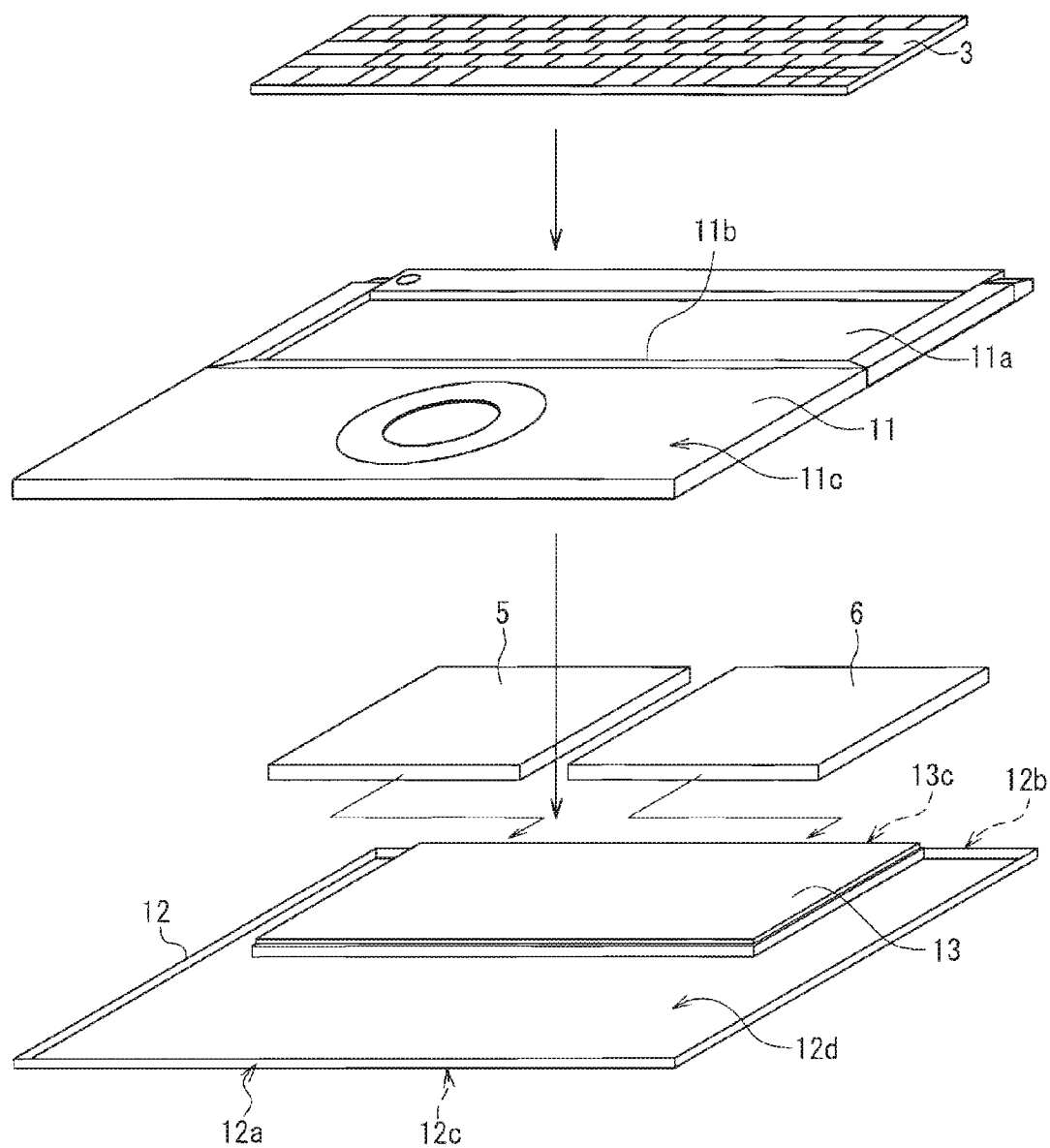
FIG. 2 is an exploded perspective view of a first casing of an information processing apparatus.

FIG. 2 is an exploded perspective view of the first casing 1. As shown in FIG. 2, the first casing 1 is configured mainly of the keyboard 3, a battery 5, a drive unit 6, an upper casing 11, and a lower casing 12. In the upper casing 11, an opening 11a is formed at a portion where the keyboard 3 is to be disposed. In the lower casing 12, a support portion 13 is formed so as to underlay the opening 11a of the upper casing 11. In the lower casing 12, the face that is facing a user when the user is using a notebook PC in a normal posture is defined as a front face 12a; the face that is opposite with respect to the front face 12a is defined as a rear face 12b; the face that is adjacent to the front face 12a and the rear face 12b and that is opposite with respect to an upper face 11c of the upper casing 11 is defined as an underside face 12c; and the face that is on a reverse side (inner face of the lower casing 12) to the underside face 12c is defined as a bottom face 12d. The support portion 13 includes a recess portion 13c therein. The recess portion 13c is opened at the side of the underside face 12c and the side of the rear face 12b of the lower casing 12. The battery 5 and the drive unit 6 can be attached to and detached from the recess portion 13c, from the side of the rear face 12b of the lower casing 12. Although not illustrated, a circuit board with various electrical elements such as a central processing unit (CPU) and a memory mounted thereon are fixed on the bottom face of the lower casing 12.

Figure 3:
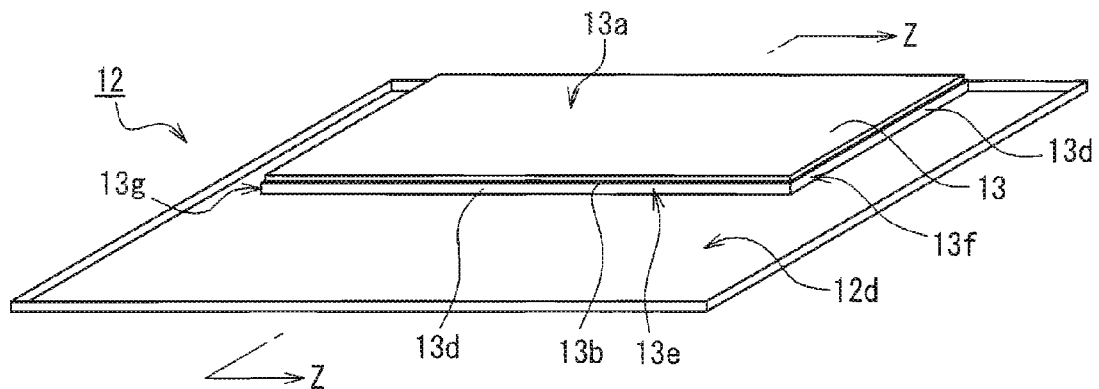
FIG. 3 is a perspective view of a lower casing.
Figure 4:
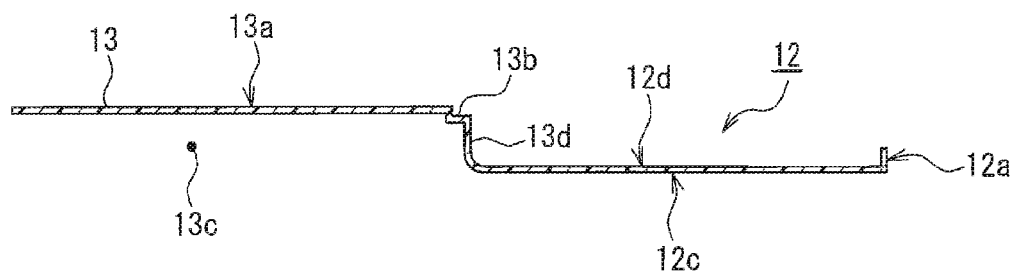
FIG. 4 is a cross-sectional view taken along a line Z-Z in FIG. 3.

FIG. 3 is a perspective view of the lower casing 12. FIG. 4 is a cross-sectional view taken along a line Z-Z in FIG. 3. As shown in FIGS. 3 and 4, the support portion 13 is provided with a supporting face 13a that blocks the opening 11a from the rear side of the upper casing 11 when the upper casing 11 and the lower casing 12 are coupled. The supporting face 13a is formed integrally with a wall portion 13d that is arranged to stand in a direction substantially perpendicular to the bottom face 12d of the lower casing 12, and formed to extend from the upper end of the wall portion 13d in the direction substantially parallel to the bottom face 12d. The support portion 13 also includes a step portion 13b formed at an end portion of the front face 12a side of the supporting face 13a. As shown in FIG. 4, the height of the step portion 13b from the bottom face 12d is shorter than the height from the bottom face 12d to the supporting face 13a. The step portions 13b are formed in the proximity of the border portion between the supporting face 13a and the front wall portion 13e, the border between the supporting face 13a and a side wall portion 13f, and the border between the supporting face 13a and a side wall portion 13g.

Figure 5:
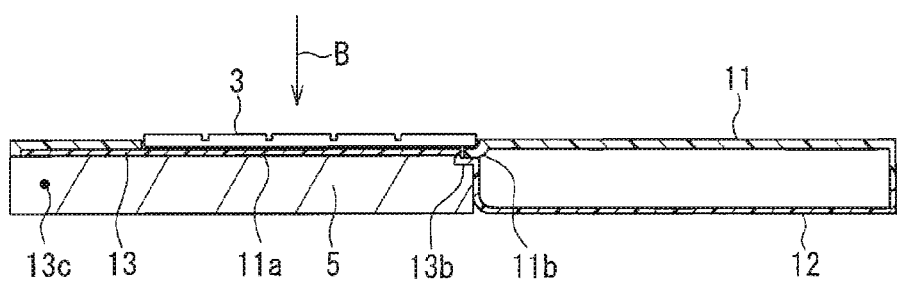
FIG. 5 is a cross-sectional view of a first casing.

FIG. 5 is a cross-sectional view of the first casing 1, and the cross section shown is taken along the same line as the line Z-Z of FIG. 3. As shown in FIG. 5, when the upper casing 11 and the lower casing 12 are assembled together, the support portion 13 is disposed at a position where the opening 11a formed in the upper casing 11 is covered from the rear side of the upper casing 11. At this point, an end portion 11b of the upper casing 11 abuts the step portion 13b, so that deformation of the upper casing 11 in the direction indicated by arrow B is restrained.

The keyboard 3 is disposed at a position where the opening 11a is covered from the side of the upper face 11c of the upper casing 11. At this point, the rear side of the keyboard 3 is disposed to face the supporting face 13a with the opening 11a in between. Furthermore, the battery 5 (or drive unit 6) is disposed in the recess portion 13c formed below the supporting face 13a.

In the following, keyboard operability in an information processing apparatus in this embodiment is described.

The keys included in the keyboard 3 are provided with a click mechanism for giving a reasonable degree of resistance (hardness) to the fingers, when a user depresses the keys with his/her fingers. As for this click mechanism, an appropriate degree of hardness is set in view of the fact that erroneous operation increases when the resistance upon pressing in the keys from the pre-operation position to the post-operation position (depressed position) is too low, and that fatigue of a user increases with too high a resistance.

However, with the configuration without a strong support on the rear side of the operational side of the keyboard 3, the keyboard 3 or the upper casing 11 flexes in the direction of the depressing when the keys are pressed by the fingers, causing the keys to slightly sink, and impairing the click feeling. Particularly, in many of the recent notebook PCs, the casing is molded with a material of a light metal such as aluminum, magnesium, an aluminum alloy, and a magnesium alloy for a lightweight, compact, and robust casing, and for achieving a light weight, efforts are made to achieve thin casings. Therefore, even though a configuration is adapted in which the rear side of the operational side of the keyboard 3 is supported by a thinly made upper casing 11, when the keys are pressed down, the upper casing 11 flexes in the direction of the depressing, impairing the click feeling of the keyboard 3.

Thus, in a configuration of this embodiment, as shown in FIG. 5, the support portion 13 is provided integrally with the lower casing 12, and the support portion 13 is disposed below the keyboard 3. With such a configuration, the supporting face 13a of the support portion 13 is disposed to face the rear side of the keyboard 3 so that the supporting face 13a can abut the rear side of the keyboard 3 when the keyboard 3 is depressed in the direction indicated by arrow B. By allowing the rear side of the keyboard 3 to abut the supporting face 13a, deformation of the keyboard 3 in the direction of depressing is restrained, which prevents impairment of the click feeling of the keys.

In this case, with a configuration in which the support portion 13 supports a range as wide as possible from the center of the keyboard 3, the sinking of the keyboard 3 will become less when the keys of the keyboard 3 are pressed in the direction indicated by arrow B, and the click feeling of the keys is achieved.

According to this embodiment, with a configuration in which the support portion 13 is provided integrally with the lower casing 12 and disposed below the keyboard 3, the keyboard 3 can be prevented from being flexed in the direction of depressing when the keyboard 3 is depressed, and therefore impairment of the click feeling of the keys in the keyboard 3 can be prevented.

Furthermore, as shown in FIG. 5, by configuring the upper casing 11 in such a manner that the end portion 11b of the upper casing 11 is mounted on the step portion 13b of the lower casing 12, the deformation of the upper casing 11 can be curbed when the keyboard 3 or the upper casing 11 is depressed in the direction indicated by arrow B, and the overall strength of the casing can be improved. Thus, various electrical elements disposed between the upper casing 11 and the lower casing 12 can be prevented from being damaged.

Figure 6:
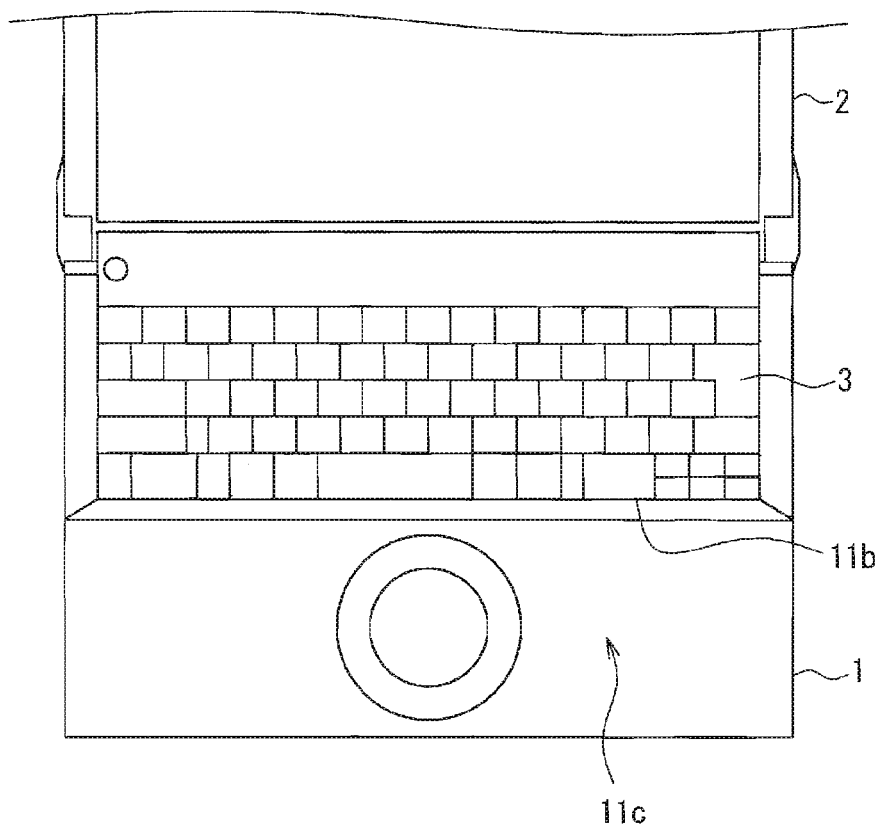
FIG. 6 is a plan view of a first casing.

Particularly, as shown in FIG. 6 (plan view of the first casing 1), because the end portion 11b is positioned at substantially the center of the upper face 11c of the upper casing 11, flexural rigidity in the direction indicated by arrow B (ref. FIG. 5) is low. Thus, as shown in FIG. 5, with a configuration in which the end portion 11b is mounted on the step portion 13b, even when a pressure is applied to the substantially center portion of the upper casing 11 in the direction indicated by arrow B, the deformation at the substantially center portion of the upper casing 11 can be curbed.

Furthermore, since the recess portion 13c can be formed below the support portion 13, various components can be disposed inside the recess portion 13c, allowing effective use of space. In this embodiment, the battery 5 and the drive unit 6 are disposed in the recess portion 13c.

Furthermore, the components disposed in the recess portion 13c below the support portion 13 can be protected from pressure from outside. For example, when the battery 5 is disposed in the recess portion 13c as in this embodiment, the pressure applied to the keyboard 3 in the direction indicated by arrow B is received by the support portion 13, and therefore the pressure is not passed on to the battery 5. Therefore, since the battery 5 does not change its position from the pressure application, disconnection of a connector connecting the battery 5 and the notebook PC electrically can be prevented. Also, when the drive unit 6 with a hard disk provided is disposed in the recess portion 13c as in this embodiment, similarly to the above-described case, the pressure is not passed on to the drive unit 6. Thus, mechanism components such as bearings in the drive unit 6 can be prevented from being damaged.

Furthermore, with a configuration in which the opening 11a is provided in the support portion 13 and the keyboard 3 is disposed in the opening 11a, the thickness of the first casing 1 including the keyboard 3 can be made thin.

Although a notebook PC is used as an example of the information processing apparatus in this embodiment, the present invention is effective as long as an information processing apparatus is provided with at least operational means such as keyboard. Examples of such an information processing apparatus include PDA (personal digital assistance), mobile game console, and medical instruments.

Although this embodiment has a configuration in which the opening 11a is formed in the upper casing 11, a configuration without the opening 11a is also possible. In such a case, by disposing the support portion 13 in the upper casing 11 at a position below the portion where the keyboard 3 is disposed, the flexing of the keyboard 3 in the direction of depressing when the keyboard 3 is depressed, and the click feeling of the keys included in the keyboard 3 can be prevented from being impaired.

Although the step portion 13b is formed in the proximity of the border portion between the supporting face 13a and the wall portion 13d (front wall portion 13e, side wall portions 13f and 13g) as shown in FIG. 3 in this embodiment, a configuration in which the step portion 13b is formed only in the proximity of the border portion between the supporting face 13a and the front wall portion 13e can also curb the deformation of the upper casing 11 when the keyboard 3 or the upper casing 11 is depressed in the direction indicated by arrow B, achieving an improvement in overall strength of the casing.

Figure 7:
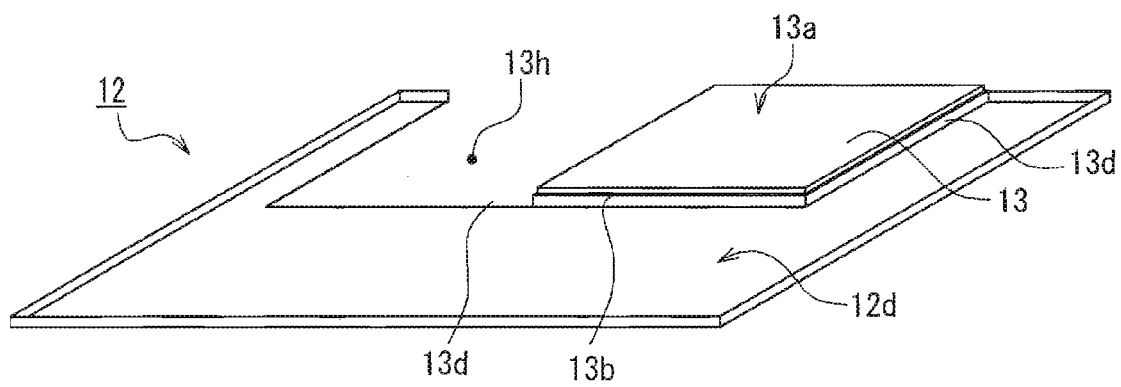
FIG. 7 is a perspective view illustrating another structural example of a lower casing in an embodiment.
Figure 8:
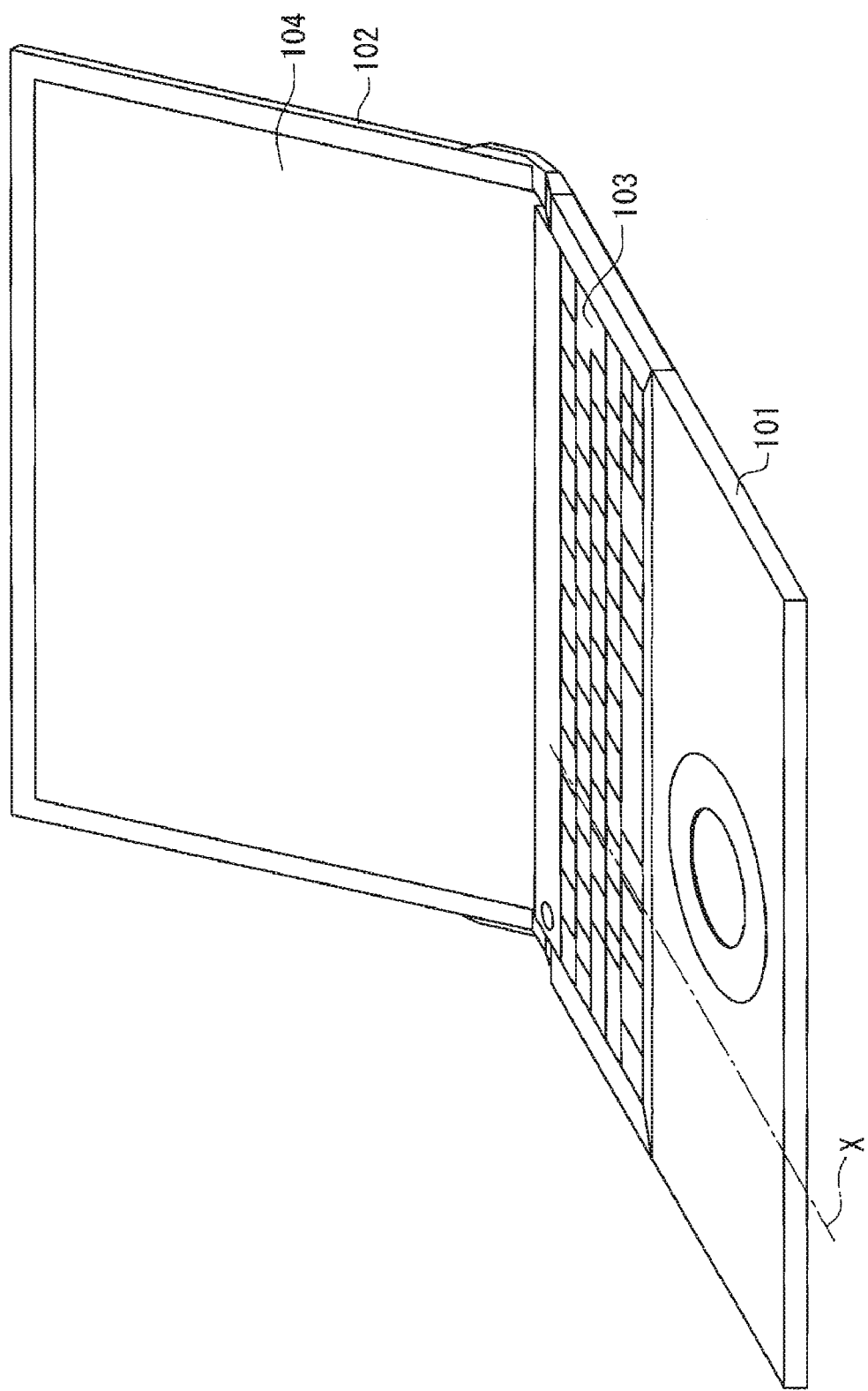
FIG. 8 is a perspective view illustrating an external view of a conventional information processing apparatus.
Figure 9:
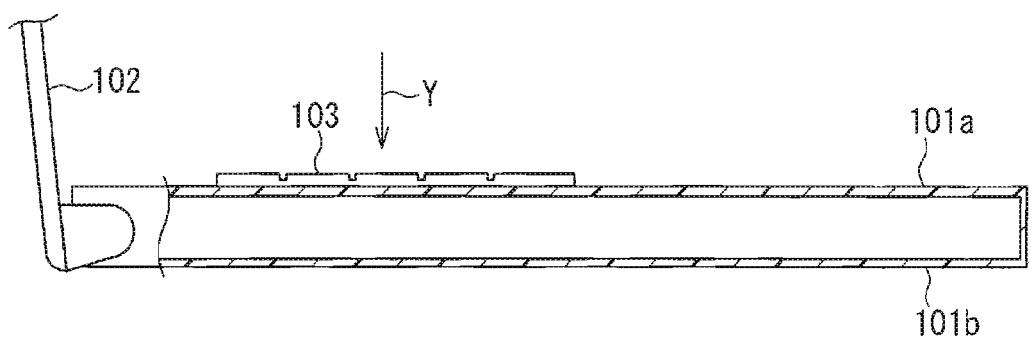
FIG. 9 is a cross-sectional view taken along a dash dotted line portion X in FIG. 8.
Figure 10:
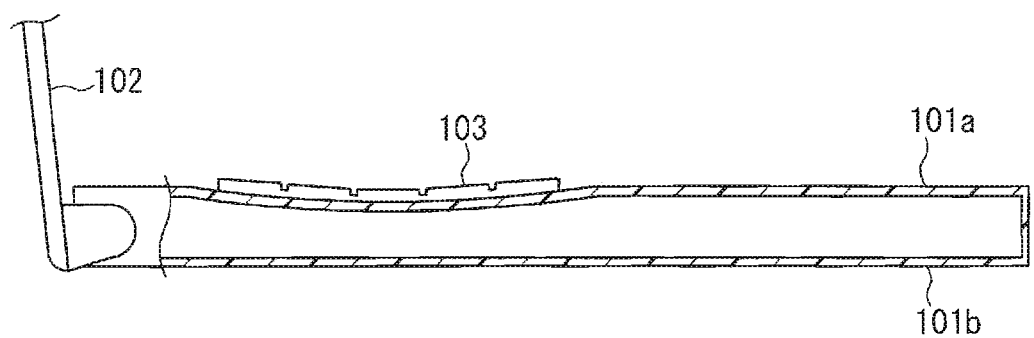
FIG. 10 is a cross-sectional view of a first casing when a keyboard is flexed.

Although the support portion 13 is formed at a position at which the battery 5 and the drive unit 6 are covered in this embodiment, a configuration in which the support portion 13 is formed at a position at which only the drive unit 6 is covered is also possible, as shown in FIG. 7. In such a configuration, at the position where the battery 5 is disposed in a lower casing 12, a cut-out portion 13h is formed. Generally, the battery 5 is covered by a resin casing having an outer shell with shock-resistant strength. Therefore, even with the battery 5 not covered by the support portion 13 when mounted on a notebook PC, displacement of the upper casing 11 can be restrained when the keyboard 3 or the upper casing 11 is depressed in the direction indicated by arrow B. Therefore, deformation of the upper casing 11 can be curbed, and the overall strength of the casing can be improved. Although not illustrated, in a preferable configuration, a step portion corresponding to the step portion 13b is provided at a portion of the casing of the battery 5, to catch the portion of the upper casing 11.

An information processing apparatus of the present invention is useful for a casing structure of notebook personal computers and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing apparatus comprising:
    an upper casing;
    a lower casing coupled to the upper casing and forming a space for housing at least an electrical element; and
    a keyboard disposed on an upper surface of the upper casing,
    wherein the lower casing comprises
        an inner bottom;
        a wall portion arranged to stand from the inner bottom, and
        a supporting face formed integrally with the wall portion from the upper end of the wall portion in a direction substantially parallel to the inner bottom; and
    the supporting face is disposed at a position where the rear side of the operational side of the keyboard can be supported.

2. The information processing apparatus according to claim 1, wherein the supporting face is disposed at a position where a portion of the upper casing can be supported.

3. The information processing apparatus according to claim 1, wherein the upper casing and the lower casing are molded of any of aluminum, magnesium, an aluminum alloy, and a magnesium alloy.

* * * * *